(12) United States Patent
Sundberg (10) Patent No.: US 6,363,457 B1
(45) Date of Patent: Mar. 26, 2002

(54) METHOD AND SYSTEM FOR NON-DISRUPTIVE ADDITION AND DELETION OF LOGICAL DEVICES

(75) Inventor: Gerald Franklin Sundberg, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/246,540

(22) Filed: Feb. 8, 1999

(51) Int. Cl.⁷ ................................................ G06F 12/00
(52) U.S. Cl. ........................ 711/114; 711/170; 711/172
(58) Field of Search ................................. 711/112, 114, 711/170, 172; 714/6, 7, 710

(56) References Cited

U.S. PATENT DOCUMENTS

| | | | |
|---|---|---|---|
| 5,301,297 A | 4/1994 | Menon et al. | 711/114 |
| 5,394,532 A | 2/1995 | Belsan | 711/114 |
| 5,519,844 A | 5/1996 | Stallmo | 711/114 |
| 5,542,065 A | 7/1996 | Burkes et al. | 711/114 |
| 5,568,629 A | 10/1996 | Gentry et al. | 711/114 |
| 5,671,439 A | 9/1997 | Klein et al. | 711/114 |
| 5,822,782 A | * 10/1998 | Humlicek et al. | 711/170 |
| 5,950,230 A | * 9/1999 | Islam et al. | 711/114 |
| 5,973,690 A | * 10/1999 | Ofer et al. | 345/340 |
| 5,996,054 A | * 11/1999 | Ledain et al. | 711/112 |
| 6,178,520 B1 | * 1/2001 | DeKoning et al. | 711/114 |
| 6,243,790 B1 | * 6/2001 | Yorimitsu | 711/112 |

FOREIGN PATENT DOCUMENTS

JP  10-105345  * 4/1998

* cited by examiner

Primary Examiner—Do Hyun Yoo
Assistant Examiner—Yamir Encarnacion
(74) Attorney, Agent, or Firm—Robert O. Guillot; Oppenheimer Wolff & Donnelly LLP (57) ABSTRACT

A method and system is provided where once the disk array subsystem has been initialized and mapped, addition and deletion of logical drives will be made without interruption to system operation. In adding a logical device, a method is provided to determine the amount of space required in adding the new logical device and the amount of physical space available for such operation. In adding such a new logical device, the data of the new logical device may be placed anywhere on the physical drives. In deleting a logical device, the space made available when deleting the data of the logical device creates a physical gap to the original mapping where the gap could be filled by subsequent additions of new logical devices. Once a new mapping is determined, the mapping is sent to the adapters and device controllers to update the mapping information available to the adapters and the device controllers in order for the adapters and the device controllers to properly address data in the disk array subsystem.

24 Claims, 7 Drawing Sheets

METHOD AND SYSTEM FOR NON-DISRUPTIVE ADDITION AND DELETION OF LOGICAL DEVICES

FIELD OF THE INVENTION

The present invention generally relates to disk storage devices for computer systems and, more particularly, to method and system for redundant disk array storage systems.

BACKGROUND OF THE INVENTION

A typical data processing system generally involves one or more storage units which are connected to a Central Processor Unit (CPU) either directly or through a control unit and a channel. The function of the storage units is to store data and programs which the CPU uses in performing the variety of data processing tasks.

Various type of storage units are used in current data processing systems. A typical system may include one or more large capacity tape units and/or disk drives (magnetic, optical, or semiconductor-based) connected to the system through respective control units for storing data. However, a problems exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes ("ECC") which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails.

Other approaches to such external reliability have been described in the art. A research group at the University of California, Berkeley, in a paper entitled "A Case for Redundant Arrays of Inexpensive Disks (RAID)", Patterson, et al., Proc. ACM SIGMOD, June 1988, has catalogued a number of different approaches for providing such reliability when using disk drives as storage units. Arrays of disk drives are characterized in one of five architectures, under the acronym RAID.

For example, a RAID 1 architecture involves providing a duplicate set of "mirror" storage units and keeping a duplicate copy of all data on each pair of storage units. A RAID 2 architecture stores each bit of each word of data, plus Error Detection and Correction (EDC) bits for each word, on separate disk drives (also known as "bit stripping"). A RAID 3 architecture is based on the concept that each disk drive storage unit has internal means for detecting a fault or data error. A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (also know as block stripping). Finally, a RAID 5 architecture uses the same parity error correction concept of the RAID 4 architecture and independent actuators, but improves on the writing performance of a RAID 4 system by distributing the data and parity information across all of the available disk drives.

Figure 1:
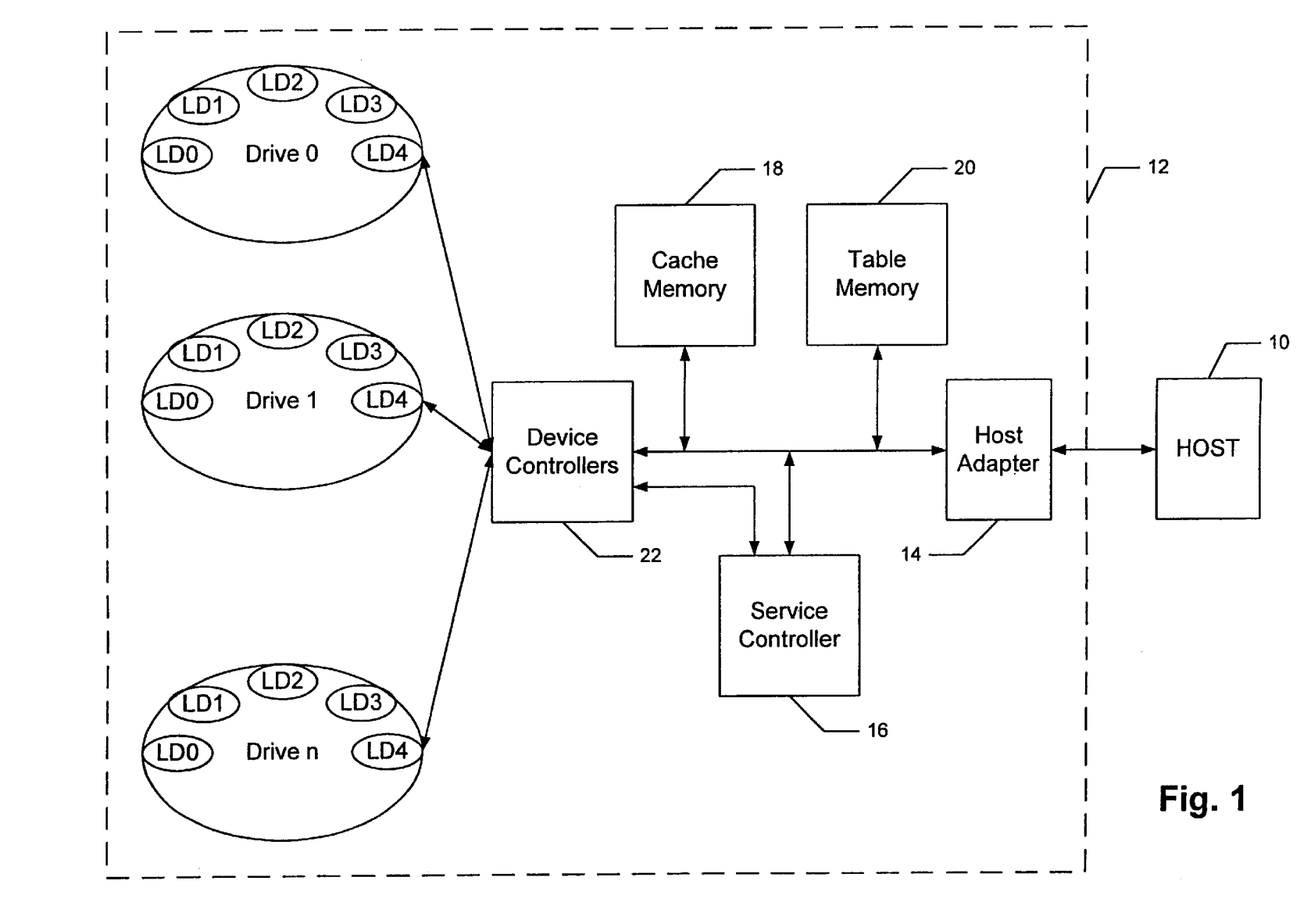
FIG. 1 is a block diagram illustrating the components of a disk array subsystem.

Implementation wise, referring FIG. 1 showing an implementation of a disk array system, a host 10 communicates with the disk array subsystem 12 via a host adapter 14. The host adapter 14 is communicatively connected to a service controller 16, a cache memory 18, a table memory 20, and a device adapters 22. The device adapter 22 is connected to a number of drives (Drive 0–Drive n). Each drive is divided into a number of logical drives (e.g. logical device 0 ("LD0") to logical device 4 ("LD4")) which can be of various sizes and types. The logical drives having the same logical drive numbers are assigned to a single RAID group.

Figure 2:
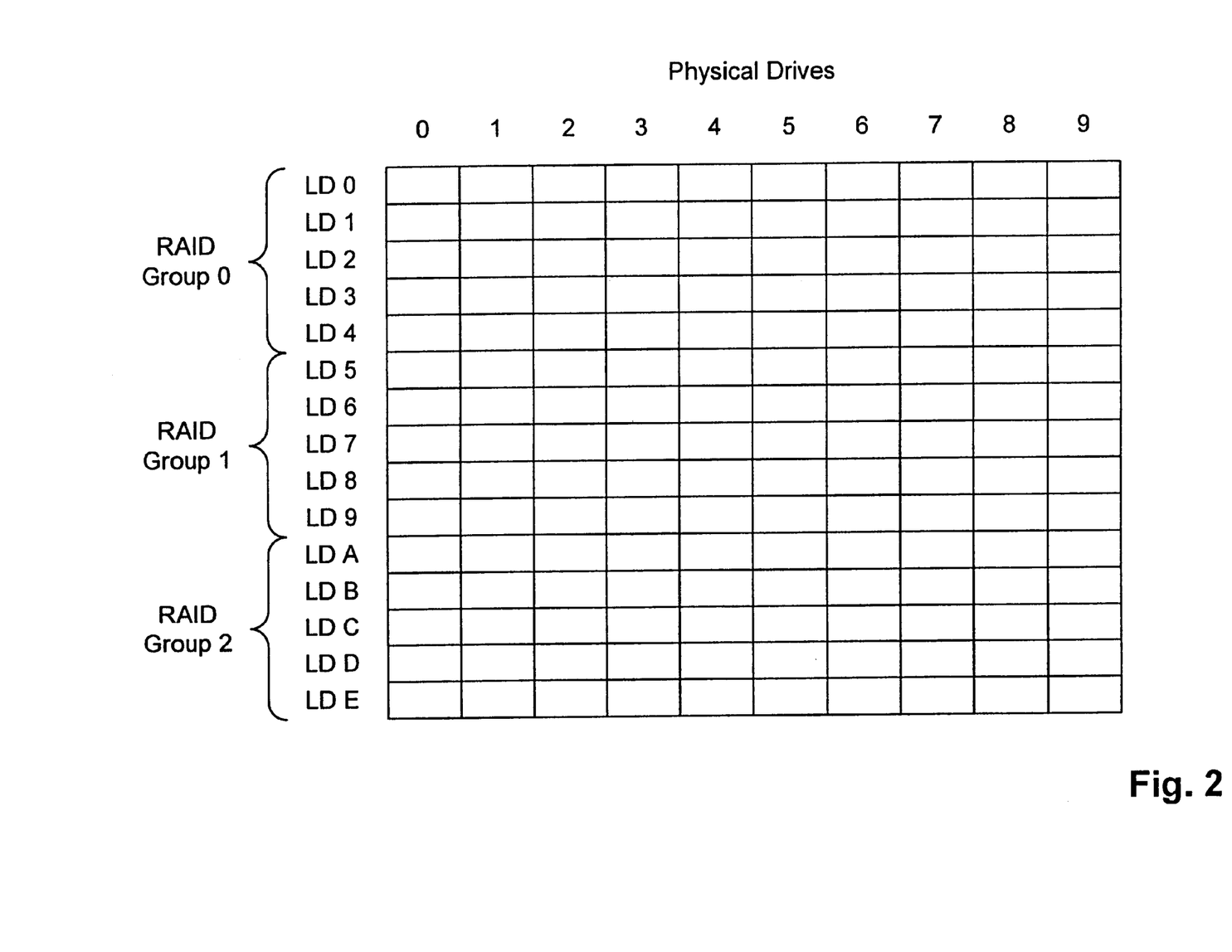
FIG. 2 is a table illustrating the relationship between physical drives, logical devices, and RAID groups.

The original design of the mapping of logical devices to the physical drives was based upon the devices being mapped in ascending order of their device number to the ascending order of the physical drive addresses and group number and only occurring at initial microcode load. FIG. 2 illustrates via a table the relationship between physical disk drives, logical devices and RAID groups. As explained above, a physical drive may be divided into a number of logical devices and a number of logical devices may be assigned to the same RAID group. For example, as illustrated, each physical drive is partitioned into several logical drives where logical devices 0–4 are assigned to RAID group 0, logical devices 5–9 are assigned to RAID group 1, and logical devices A–E are assigned to RAID group 2. This is one (1) set of three (3) RAID groups each having five (5) logical devices across ten (10) physical drives.

In assigning the logical devices to the RAID groups, referring to FIG. 2, logical device 0 is assigned to RAID group 0, starting at address 0 for a given Device Controller ("DC") pair. Logical device 1, then, is mapped at logical device 0's address plus one (1). Each device configured to the device controller pair for this group of drives is then mapped in the same way until the group is full, at which time the next RAID group will be mapped, continuing to the third RAID group until all devices have been assigned a physical location, or there is no more drive space available. Once these devices are mapped and initialized, any change in the logical device configuration (adding or removing a logical device) will change the physical mapping of all devices on a given DC pair with larger logical device numbers than the one removed. This may result in the loss of access to data.

Figure 3:
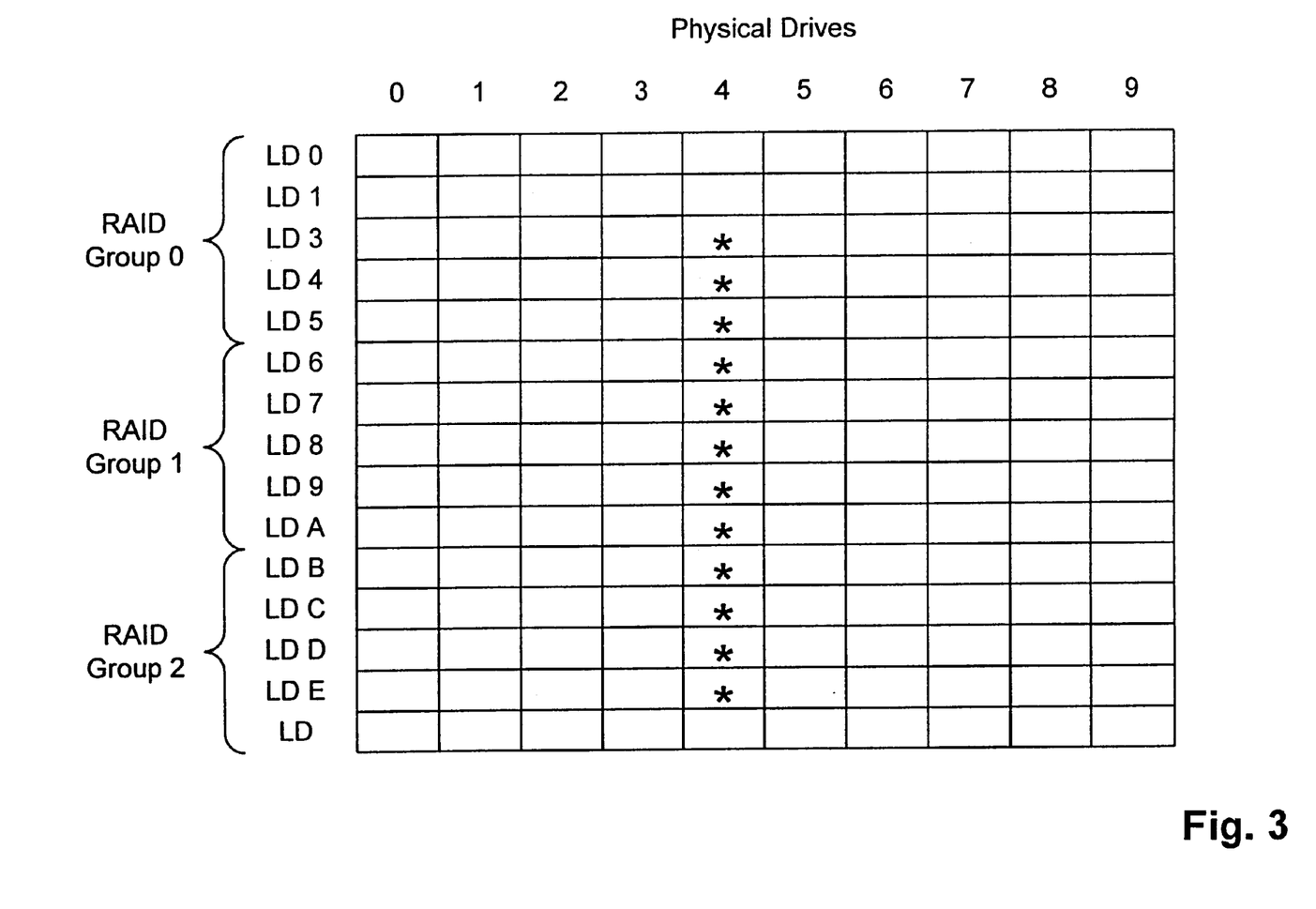
FIG. 3 is a table illustrating the data corruption resulting from removing a logical device using prior art methods.

For example, referring to FIG. 3, if for whatever reason logical device 2 is removed or deleted, the physical location on the drives for each logical devices (e.g. logical devices 3-E) would change due to the removal of logical device 2. Data in logical device 3 would be in the address space for logical device 4 and the data for logical device 3 would now appear to be corrupted. The asterisks in FIG. 3 indicate the logical devices with corrupted data.

Figure 4:
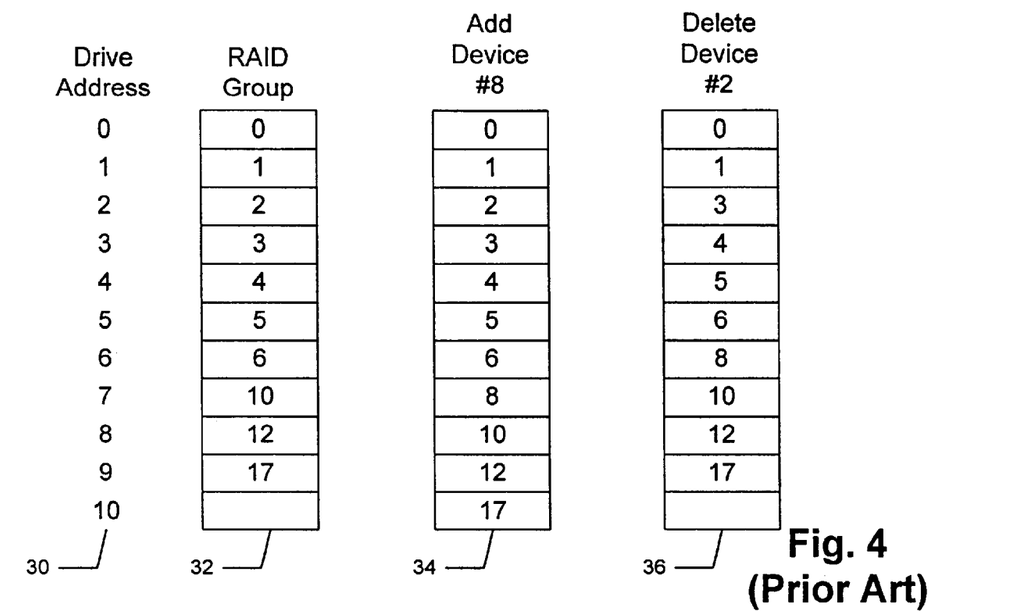
FIG. 4 is an illustration of the effect on a strip under the prior art method when a logical device is removed or added.

In order to change the logical device configuration, the data must be first off-loaded to save it before re-configuring the system. After the new configuration and mapping has been completed, the data is re-loaded to new physical locations for the corresponding devices. FIG. 4 illustrates the re-organization of the logical devices through the off-loading and re-loading process. In a first column 30, the stripe of a RAID group is illustrated and in a second column 32 (for a RAID group 0) the logical devices are illustrated. In a third column 34, logical device 8 is added and all logical devices having a higher reference numbers are shifted down through the off-load and re-load operations. In a fourth column 36, logical device 2 is removed and all logical devices having higher reference numbers are shifted up through the off-load and re-load operations.

The problem is that when the disk array subsystem is being off-loaded or re-loaded, the subsystem is not available for access. For mission critical systems, this is not an acceptable situation. Therefore, there is a desire for a method and system for addition and/or removal of logical devices without having to off-load and re-load the disk array subsystem and thereby providing non-disruptive and continuous system operation.

SUMMARY OF THE INVENTION

It is therefore an object of the present invention to provide a method and system for the non-disruptive addition and deletion of logical devices.

It is another object of the present invention to provide a method and system for maintaining system operation without noticeable degradation in system performance while adding or deleting logical devices.

Briefly, in a presently preferred embodiment of the present invention, a method and system is provided where once the disk array subsystem has been initialized and mapped, addition and deletion of logical drives will be made without interruption to system operation. In adding a logical device, a method is provided to determine the amount of space required in adding the new logical device and the amount of physical space available for such operation. In adding such a new logical device, the data of the new logical device may be placed anywhere on the physical drives. In deleting a logical device, the space made available when deleting the data of the logical device creates a physical gap to the original mapping where the gap could be filled by subsequent additions of new logical devices. Once a new mapping is determined, the mapping is sent to the adapters and device controllers to update the mapping information available to the adapters and the device controllers in order for the adapters and the device controllers to properly address data in the disk array subsystem.

An object of the present invention is to provide a method and system for the nondisruptive addition and deletion of logical devices.

Another object of the present invention is to provide a method and system for maintaining system operation without noticeable degradation in system performance while adding or deleting logical devices.

These and other features and advantages of the present invention will become well understood upon examining the figures and reading the following detailed description of the invention.

DETAILED DESCRIPTION OF THE PREFERRED EMBODIMENTS

The present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer program(s) coded in accordance with the invention.

Figure 5:
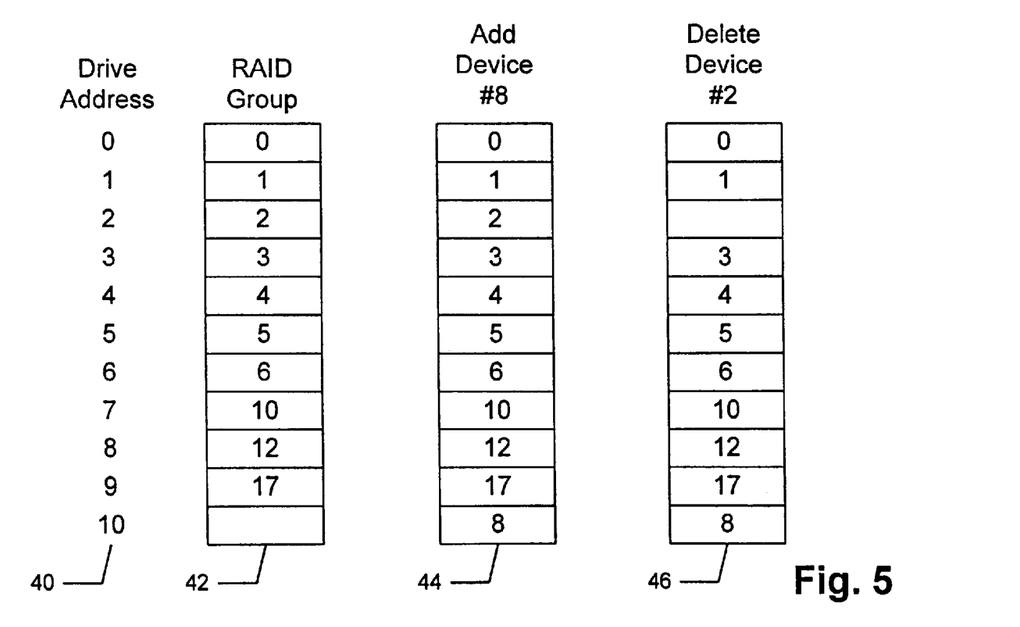
FIG. 5 is an illustration of the effect on a strip under the preferred embodiment of the present invention when a logical device is removed or added.

In a presently preferred embodiment of the present invention, referring to FIG. 5, a method and system is provided where logical devices are managed in such a manner where the addition or deletion of a logical device does not affect system operation. Customer does not have to forecast future needs and set up all devices at initial configuration and load. In the deletion of a logical device, the presently preferred embodiment provides a method whereby the deletion of a logical device only requires an update of the configuration table and the space made available on the corresponding physical drives remains available for later use. The remaining logical devices maintain their original addresses and their data space is not affected. In adding a logical device, the presently preferred embodiment provides a method where the amount of space required by the new logical device and the amount of available space on the physical drives are compared and a mapping for the new logical device is created and a simple update to the configuration table is made. The present invention can be implemented for all RAID group types.

FIG. 5 illustrates the result of the operations of the preferred embodiment. In a first column 40, the drive address referenced by the stripe are listed. In a second column 42, the logical devices of a RAID group 0 are listed. In a third column 44, the addition of a new logical device (device 8) is shown where it is added to the end of the available physical space (rather than in order as in the prior art). By adding the new logical device to available space wherever the space might be found, no re-initialization of the disk array subsystem is required. Initialization of new devices occur in the background mode with little or no impact to subsystem operation or performance. In a fourth column 46, the deletion of a logical device (device 2) is managed such that the space made available from deleting the logical device remains unoccupied. In this manner, no data will be reshuffled and no re-initialization of the disk array subsystem is required.

Figure 6:
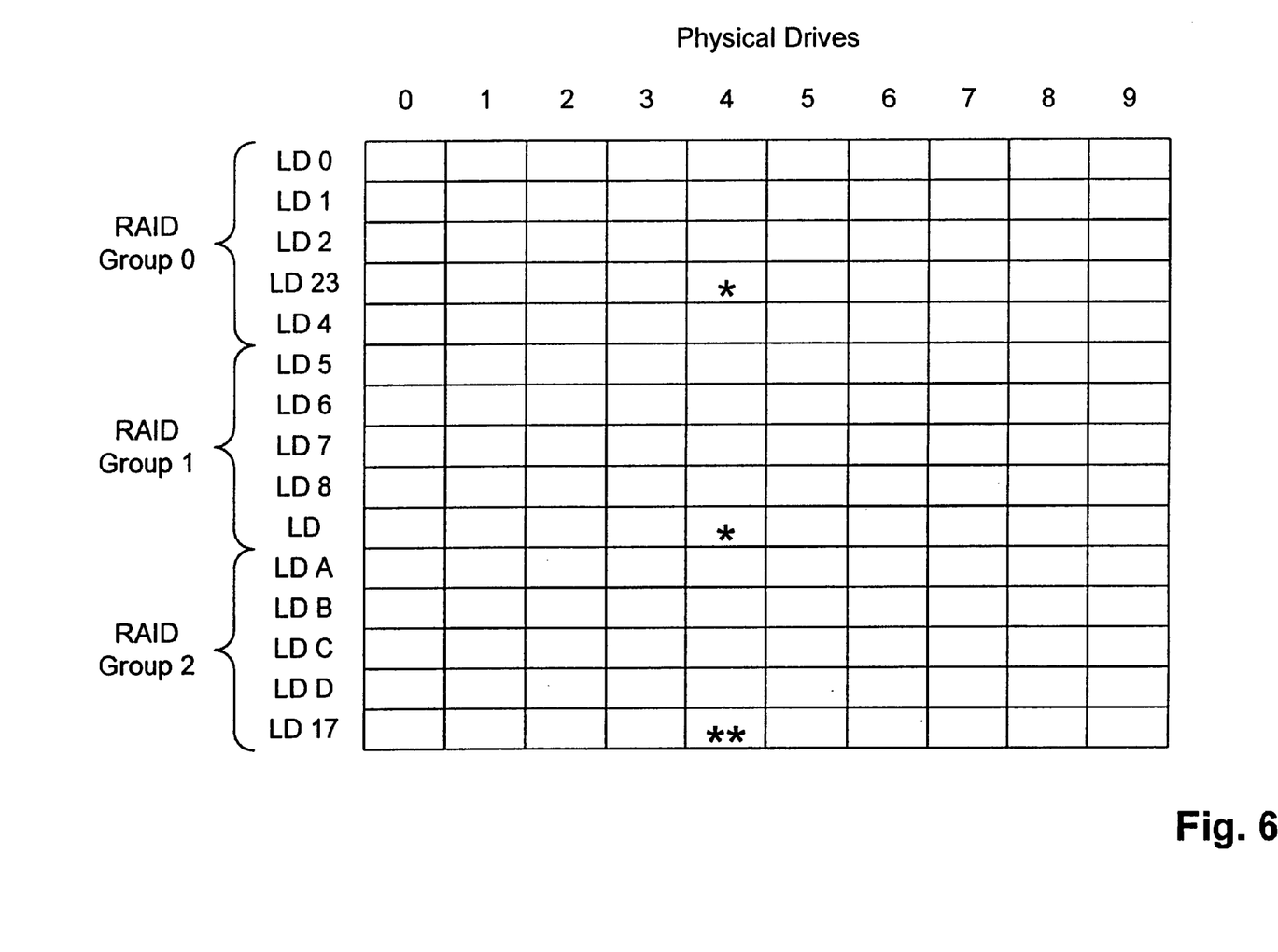
FIG. 6 is a table illustrating the status of the physical drive storage space after the addition and removal of logical devices under the preferred embodiment of the present invention.

FIG. 6 provides an illustration of the resulting mapping of a disk array subsystem using the preferred embodiment of the present invention. Considering FIG. 6 having been originally mapped the same as FIG. 2, as it can be seen, logical devices 3, 9, and E have been deleted. Logical device 23, being the same type and size as the original logical device 3, has been added. Logical device 17, being the same type and size as the original logical device E, has been added as well. The space previously occupied by logical device 9 remains empty. There are no other changes in the mapping addresses and location of the other original logical devices. At the same time, the disk array subsystem remains fully operational.

Figure 7:
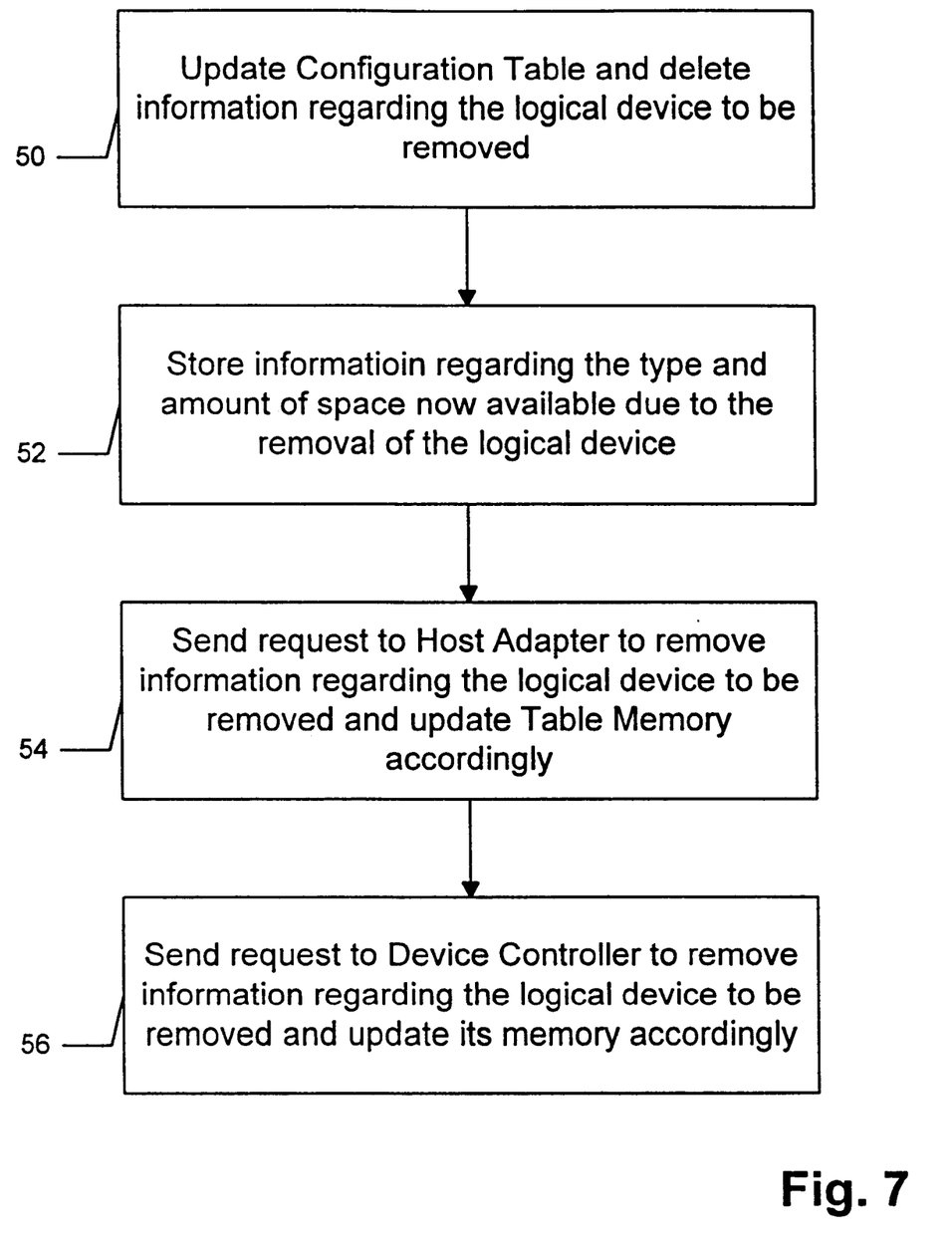
FIG. 7 is a flow chart illustrating the steps in removing a logical device under the preferred embodiment of the present invention.

In carrying the steps for removing a logical device from the subsystem, referring to FIG. 7, in a first step, the configuration table is updated to delete information regarding the logical device that is being removed. The information with regard to the type and amount of space now available is stored in the configuration table (step 52). In the next step, a message is sent to the Host Adapter to remove information regarding the logical device that is being removed, and Table Memory is updated accordingly. Similarly, a message is sent to the Device Controller to remove information with respect to the logical device that is being removed. In this manner, all three processors, the Host Adapter, the Service Controller, and the Device Controller are synchronized as to the logical devices and the type and amount of storage available on the system.

Figure 8:
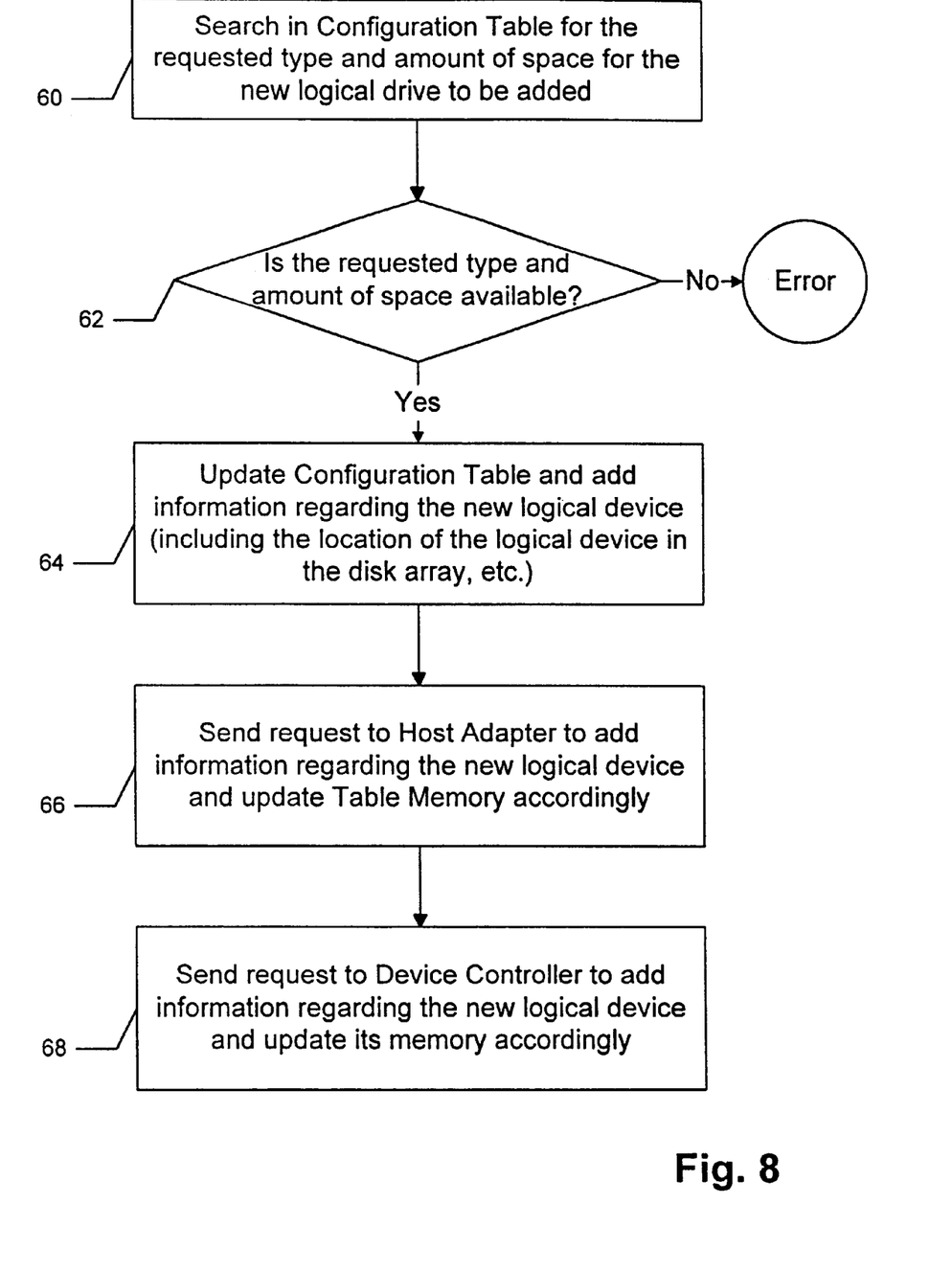
FIG. 8 is a flow chart illustrating the steps in adding a logical device under the preferred embodiment of the present invention.

In adding a logical device, referring to FIG. 8, a search is conducted for the required type and amount of space for the new logical device (step 60). If the required type and amount of space is not available, an insufficient space error is issued. If the required type and amount of space is available, the configuration table is updated to include information regarding the new logical device (step 64). Then, a message is sent to the Host Adapter to add to the Table Memory information regarding the new logical device and a message is sent to the Device Controller to update its memory accordingly with respect to the new logical device.

Note that after deleting several logical devices, there may be blocks of spaces available. Now, in the search for an available space for the new logical device, these blocks of spaces are checked. If there is a block of space that meets the required type and amount of the space needed for the new logical device, this space is then designated for the new logical device.

The configuration table of the presently preferred embodiment stores a number of parameter values for the subsystem. There are several groups parameter values including values for service controller, host adapters/directors, table memory/cache memory, device adapters/controllers, fans/power supplies/batteries, and logical devices. For the service controllers, there are parameters associated with status of the subsystem, install (or not) status, part number, serial number, engineering change level, code release level, and system information (part and serial numbers). For the host adapters/directors, there are parameters associated with status, install status, part number, serial number, engineering change level, type (ESCON, bus and tag, or open systems), channel information (status, identifier, speed, type-ESCON, bus and tag), code to load on the adapter, control unit information (number and status), logical device information (status, identifier, emulated type, and size). With respect to the table memory/cache memory, there are parameters associated with identifier, install status, size, status, part number, serial number, and engineering change level. For the device adapters/controllers, there are parameters for identifier, install status, status, part number, serial number, engineering change level, size or RAID group, type of drives, code to load on this adapter, physical drives (status, drive id, part number, serial number, engineering change level, capacity, vendor, and product id). For the fans/power supplies/batteries group, there are parameters for identifier, install status, and serial number. For the logical devices, there are device number, status, emulated device type, size, starting address (on the physical drive), ending address, DC pair having control of this device, and drive group this device is located on.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A method for removing logical devices in a disk array subsystem having a plurality of physical disk drives each being partitioned into a plurality of logical devices, each logical device having a portion of data stored on each one of the physical drives, said logical devices being assigned to one or more groups, comprising the steps of:

removing information associated with a specified logical device from a configuration table, thereby causing a predefined type and amount of physical space occupied by said specified logical device to be freed;

storing information associated with said freed predefined type and amount of physical space; and updating information associated with said specified logical device in said disk array subsystem, wherein removal of said information associated with said specified logical device is managed such that said space made available upon removing said information remains unoccupied, whereby information need not be reshuffled and whereby re-initialization of the disk array subsystem is not required.

2. A method as recited in claim 1 wherein said step of updating information associated with said specified logical device in said disk array subsystem further includes updating a table memory of a host adapter of said disk array subsystem.

3. A method as recited in claim 1 wherein said step of updating further includes updating a device controller of said disk array subsystem.

4. A method as recited in claim 2 wherein said step of updating further includes updating a device controller of said disk array subsystem.

5. A method as recited in claim 1 where said disk array subsystem is a RAID system.

6. A method for adding logical devices in a disk array subsystem having a plurality of physical disk drives each being partitioned into a plurality of logical devices, each logical device having a portion of data stored on each one of the physical drives, said logical devices being assigned to one or more groups, comprising the steps of:

searching for a predetermined type and amount of physical space in a configuration table;

finding and designating said predetermined type and amount of physical space for a new logical device and updating information in said configuration table associated with said new logical device; and updating information associated with said new logical device in said disk array subsystem, wherein updating of the information associated with said new logical device is managed such that information need not be reshuffled and re-initialization of the disk array subsystem is not required.

7. A method as recited in claim 6 wherein said step of updating further includes updating a table memory of a host adapter of said disk array subsystem.

8. A method as recited in claim 6 wherein said step of updating further includes updating a device controller of said disk array subsystem.

9. A method as recited in claim 7 wherein said step of updating further includes updating a device controller of said disk array subsystem.

10. A method as recited in claim 6 where said disk array subsystem is a RAID system.

11. In a disk array system having a plurality of physical disk drives each being partitioned into a plurality of logical devices and said logical devices assigned to one or more groups, each logical device having a portion of data stored on each one of the physical drives, an improved method for maintaining logical devices comprising the steps of:

removing information associated with a specified logical device from a configuration table, wherein a predefined type and amount of physical space occupied by said specified logical device is to be freed;

storing information associated with said freed predefined type and amount of physical space;

updating information associated with said specified logical device in said disk array subsystem;

searching for a predetermined type and amount of physical space in said configuration table;

finding and designating said predetermined type and amount of physical space for a new logical device and updating information in said configuration table associated with said new logical device; and updating information associated with said new logical device in said disk array subsystem, wherein removal of said information associated with said specified logical device is managed such that said space made available upon removing said information remains unoccupied, whereby information need not be reshuffled and whereby re-initialization of the disk array subsystem is not required.

12. A method as recited in claim 11 wherein said predetermined type and amount of physical space is within the type and space of said predefined type and amount of physical space.

13. A method as recited in claim 11 wherein said step of updating information associated with said specified logical device further includes updating a table memory of a host adapter of said disk array subsystem.

14. A method as recited in claim 11 wherein said step of updating information associated with said specified logical device further includes updating a device controller of said disk array subsystem.

15. A method as recited in claim 12 wherein said step of updating information associated with said specified logical device further includes updating a device controller of said disk array subsystem.

16. A method as recited in claim 11 where said disk array system is a RAID system.

17. A computer program product including a data storage medium having a computer readable code embodied thereon and configured to operate on a computer, comprising:

a first program routine for updating a configuration table and deleting information associated with a specified logical device to be removed;

a second program routine for storing information about type and amount of space made available due to the operation of said first program routine;

a third program routine for sending a request to a host adapter to remove information associated with the specified logical device and updating a table memory; and a fourth program routine for sending a request to a device controller to remove information associated with the specified logical device, wherein removal of said information associated with said specified logical device is managed such that said space made available upon removing said information remains unoccupied, whereby information need not be reshuffled and whereby re-initialization of the disk array subsystem is not required.

18. The computer program product of claim 17, wherein:

said fourth program routine further updates a memory of the device controller.

19. A computer program product including a data storage medium having a computer readable code embodied thereon and configured to operate on a computer, comprising:

a first program routine for updating a configuration table and adding information associated with a new logical device;

a second program routine for sending a request to a host adapter to add information associated with the new logical device and for updating the configuration table accordingly; and a third program routine for sending a request to a device controller to add information associated with the new logical device, wherein updating of the information associated with said new logical device is managed such that information need not be reshuffled and re-initialization of the disk array subsystem is not required.

20. The computer program product of claim 19, wherein:

the information regarding a new logical device includes the location of the logical device in a disk array.

21. The computer program product of claim 19, and further including:

an additional program routine operationally invoked prior to said first program routine, wherein the additional program routine searches in the configuration for a particular amount of space for the new logical device to be added.

22. The computer program product of claim 21, wherein:

said additional program routine further searches for a particular type of space for the new logical device to be added.

23. The computer program product of claim 21, wherein:

said first program routine conditionally follows the additional program routine only if the additional program routine finds sufficient space for the new logical device to be added.

24. The computer program product of claim 21, wherein:

an error condition exists when the additional program routine does not find sufficient space for the new logical device to be added.

* * * * *